US011152798B2

(12) United States Patent
Hashiguchi

(10) Patent No.: US 11,152,798 B2
(45) Date of Patent: Oct. 19, 2021

(54) BATTERY CHARGER AND BATTERY SYSTEM

(71) Applicant: Nihon Video System Co., Ltd., Tsushima (JP)

(72) Inventor: Kentaro Hashiguchi, Tsushima (JP)

(73) Assignee: NIHON VIDEO SYSTEM CO., LTD., Tsushima (JP)

( * ) Notice: Subject to any disclaimer, the term of this patent is extended or adjusted under 35 U.S.C. 154(b) by 146 days.

(21) Appl. No.: 16/430,174

(22) Filed: Jun. 3, 2019

(65) Prior Publication Data

US 2019/0372362 A1 Dec. 5, 2019

(30) Foreign Application Priority Data

Jun. 4, 2018 (JP) .............................. JP2018-107182

(51) Int. Cl.
*H02J 7/00* (2006.01)
*H02J 7/02* (2016.01)
(Continued)

(52) U.S. Cl.
CPC ......... *H02J 7/0024* (2013.01); *H01M 10/441* (2013.01); *H01M 10/46* (2013.01);
(Continued)

(58) Field of Classification Search
CPC .......... B60L 53/62; B60L 53/53; B60L 58/12; B60L 3/12; B60L 2240/549;
(Continued)

(56) References Cited

U.S. PATENT DOCUMENTS 6,172,482 B1 * 1/2001 Eguchi ..................... H02H 7/18
320/134
9,184,605 B2 * 11/2015 Chang ....................... H04B 3/00
(Continued)

FOREIGN PATENT DOCUMENTS

EP 2221937 A2 * 8/2010 ............. H02J 7/0034
EP 2693514 A1 * 2/2014 ........ H01M 10/4207
(Continued)

OTHER PUBLICATIONS

Notification of Reason for Refusal dated Jul. 31, 2020, issued in corresponding Korean Application No. 10-2019-0061256, 7 pages.
(Continued)

*Primary Examiner* — M Baye Diao
(74) *Attorney, Agent, or Firm* — Christensen O'Connor Johnson Kindness

(57) ABSTRACT

The present invention provides a battery charger that enables efficient operation of the battery.
According to the present invention, provided is a battery charger, wherein
the battery charge is configured to be connectable to an AC power source and multiple batteries, and comprises a changeover switch, control switches, and a terminal for outputting a DC voltage, wherein
the control switches are configured to be capable of individually switching between a charge mode and an output mode for the batteries, respectively, the charge mode being a mode for charging the batteries using the AC power source as a power source and the output mode being a mode for outputting the DC voltage from the terminal using the batteries as a power source,
the changeover switch is configured to be capable of switching between outputting the DC voltage from the terminal using the AC power source as a power source
(Continued)

and outputting the DC voltage from the terminal using the batteries as a power source.

12 Claims, 5 Drawing Sheets

(51) Int. Cl.
   *H01M 10/44*     (2006.01)
   *H01M 10/615*    (2014.01)
   *H01M 10/46*     (2006.01)
   *H01M 10/48*     (2006.01)
   *H01M 10/633*    (2014.01)
   *H01M 10/623*    (2014.01)

(52) U.S. Cl.
   CPC ....... *H01M 10/486* (2013.01); *H01M 10/615* (2015.04); *H01M 10/623* (2015.04); *H01M 10/633* (2015.04); *H02J 7/02* (2013.01); *H01M 2220/30* (2013.01); *H02J 7/00034* (2020.01)

(58) Field of Classification Search
   CPC ......... B60L 2240/547; B60L 2240/545; B60L 58/20; B60L 2240/80; B60L 3/0038; H02J 7/342; H02J 7/1423; G01R 31/387; G01R 31/3828; G01R 31/3648; B60Y 2300/91; Y02T 90/12; Y02T 10/7072; Y02T 10/70
   USPC ....................................................... 320/104
   See application file for complete search history.

(56) References Cited

U.S. PATENT DOCUMENTS

| | | | | |
|---|---|---|---|---|
| 9,851,388 B2* | 12/2017 | Kim | .................. | H02J 7/0063 |
| 10,005,446 B2* | 6/2018 | Jeong | .................... | B60W 10/08 |
| 10,184,778 B2* | 1/2019 | Yoon | ........................ | G01L 1/16 |
| 10,491,013 B2* | 11/2019 | Kang | .................. | H01M 10/482 |
| 10,703,212 B2* | 7/2020 | Kim | ........................ | B60L 50/50 |
| 2005/0017686 A1 | 1/2005 | Sakakibara et al. | | |
| 2007/0182373 A1 | 8/2007 | Sakakibara et al. | | |
| 2012/0249071 A1* | 10/2012 | Yang | ...................... | H02J 7/0024 |
| | | | | 320/110 |
| 2014/0191705 A1 | 7/2014 | Takao et al. | | |
| 2015/0323603 A1* | 11/2015 | Kim | ...................... | H01M 10/48 |
| | | | | 702/58 |
| 2016/0006085 A1 | 1/2016 | Toya | | |
| 2016/0006280 A1 | 1/2016 | Ikeda et al. | | |
| 2016/0126760 A1 | 5/2016 | Murata | | |
| 2017/0018819 A1* | 1/2017 | Toya | ...................... | H01M 10/44 |
| 2017/0285113 A1 | 10/2017 | Hsiao | | |
| 2018/0111598 A1* | 4/2018 | Jeong | ................ | B60W 50/0097 |
| 2019/0016232 A1* | 1/2019 | Kim | ...................... | H01M 10/44 |
| 2019/0319321 A1* | 10/2019 | Wang | ...................... | H02J 7/007 |

FOREIGN PATENT DOCUMENTS

| | | | | |
|---|---|---|---|---|
| JP | 2005-235472 A | 9/2005 | | |
| JP | 3128167 U | 12/2006 | | |
| JP | 2014157778 A | 8/2014 | | |
| JP | 2014226034 A | 12/2014 | | |
| JP | 2016-015813 A | 1/2016 | | |
| JP | 6176223 B2 | 8/2017 | | |
| JP | 2017-183262 A | 10/2017 | | |
| WO | WO-2010120843 A2 * | 10/2010 | ............... | B60L 3/04 |
| WO | 2014/155903 A1 | 10/2014 | | |

OTHER PUBLICATIONS

Japanese Office Action dated Aug. 14, 2018, issued in corresponding Japanese Application No. 2018-107182, filed Jun. 4, 2018, 9 pages.
Notification of Reason for Refusal dated Feb. 18, 2021, issued in corresponding Korean Application No. 10-2019-0061256, filed May 24, 2019, 10 pages.

* cited by examiner

BATTERY CHARGER AND BATTERY SYSTEM

FIELD OF THE INVENTION

The present invention relates to a battery charger capable of charging a battery such as a lithium ion battery and having a DC output terminal, and a battery system provided with the battery charger.

BACKGROUND

Conventionally, various DC-powered devices (cameras, monitors, lighting, etc.) are used in video shooting sites. Such devices are usually powered by a battery or an AC adapter. When shooting for a long time, it is common to use an AC adapter.

With the recent development of battery technology, battery-powered long-time shooting has been increasing. Moreover, in the battery charger, the battery charger which has an AC adapter function by switching is also increasing.

A battery DC output connector adapter (hereinafter referred to as "battery adapter") manufactured by IDX Company, Ltd. can connect multiple batteries, and can output power from the multiple batteries from the DC output connector. This adapter has no function to charge the battery.

A battery charger manufactured by Japan Video Systems has a function to charge four batteries simultaneously. An AC power source can be connected to this charger. When AC power source is connected, DC output is possible by AC-DC conversion. Such a charger is capable of switching between charging a battery and performing DC output using an AC power supply as a power supply, but does not have a function of performing DC output using a battery as a power supply.

SUMMARY

Using the battery charger described above and a battery charged with this, it is possible to connect a charged battery to a DC-driven device and operate the device. In addition, for long-time shooting, it can be operated with the AC-DC conversion function of the battery charger. However, in a camera or the like that consumes a large amount of power, the DC power output by AC-DC conversion may be insufficient. In addition, in the operation in which the battery is directly attached to the device, the device has to be temporarily stopped when replacing the battery.

To avoid such problems, a charged battery can be attached to the battery adapter and the DC output from this adapter can be supplied to the device for operation. If this adapter is capable of mounting two batteries, it is possible to replace the battery one by one without turning off the device when the battery level becomes low. Therefore, battery replacement is possible without stopping the device.

However, after charging the battery with the battery charger, it is troublesome to move it to the battery adapter.

The present invention has been made in view of these circumstances, and provides a battery charger that enables efficient operation of the battery.

According to the present invention, provided is a battery charger, wherein the battery charge is configured to be connectable to an AC power source and multiple batteries, and comprises a changeover switch, control switches, and a terminal for outputting a DC voltage, wherein the control switches are configured to be capable of individually switching between a charge mode and an output mode for the batteries, respectively, the charge mode being a mode for charging the batteries using the AC power source as a power source and the output mode being a mode for outputting the DC voltage from the terminal using the batteries as a power source, the changeover switch is configured to be capable of switching between outputting the DC voltage from the terminal using the AC power source as a power source and outputting the DC voltage from the terminal using the batteries as a power source.

Multiple batteries can be connected to the battery charger of the present invention, and the multiple batteries can be individually switched between the charge mode and the output mode. Therefore, after a battery is charged in the charge mode, DC output can be performed using the battery as a power source by switching to the output mode. Thus, after charging a battery with the battery charger, it is not necessary to move the battery to the battery adapter. Therefore, efficient operation of batteries is possible.

Hereinafter, various embodiments of the present invention will be illustrated. The embodiments shown below can be combined with one another.

Preferably, the battery charger further comprises a resistor and a discharge control unit, wherein the discharge control unit is configured to cause power from the batteries to flow to the resistor to consume the power based on a predetermined condition, thereby reducing the remaining power of the batteries.

Preferably, provided is a battery system comprising the battery charger and batteries attached thereto.

Preferably, the battery system further comprises a mobile phone, wherein the battery system is configured so that an application program installed in the mobile phone and the battery charger communicate wirelessly and interlock with each other so that locations and states of the respective batteries being charged can be checked with the mobile phone.

Preferably, the battery system further comprises a mobile phone, wherein the battery system is configured so that an application program installed in the mobile phone and the batteries being charged by the battery charger communicate directly and wirelessly and interlock with each other so that states, the number of times of charging, and the internal temperatures of the respective batteries can be checked by the mobile phone.

Preferably, the check is performed by operating switches provided to the respective batteries.

Preferably, the batteries each comprise a battery cell and a heater to heat the battery cell.

Preferably, the heater is configured to operate with power stored in the battery cell.

Preferably, the batteries each comprises a temperature sensor which is capable of detecting a temperature, and the heater is configured to operate when the temperature detected by the temperature sensor is equal to or lower than a threshold.

Preferably, provided is a battery comprising a battery cell and a heater to heat the battery cell, wherein the heater is configured to operate with power stored in the battery cell.

Preferably, the battery further comprises a temperature sensor which is capable of detecting a temperature, the heater is configured to operate when the temperature detected by the temperature sensor is equal to or lower than a threshold.

Preferably, provided is a battery comprising a battery cell, a resistor, and a discharge control unit, wherein the discharge control unit is configured to cause power from the battery cell to flow to the resistor based on a predetermined condition to consume the power and reduce a remaining power of the battery cell.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Description of the Preferred Embodiments

1. First Embodiment 1-1. Configuration of Battery System 1

Figure 1:
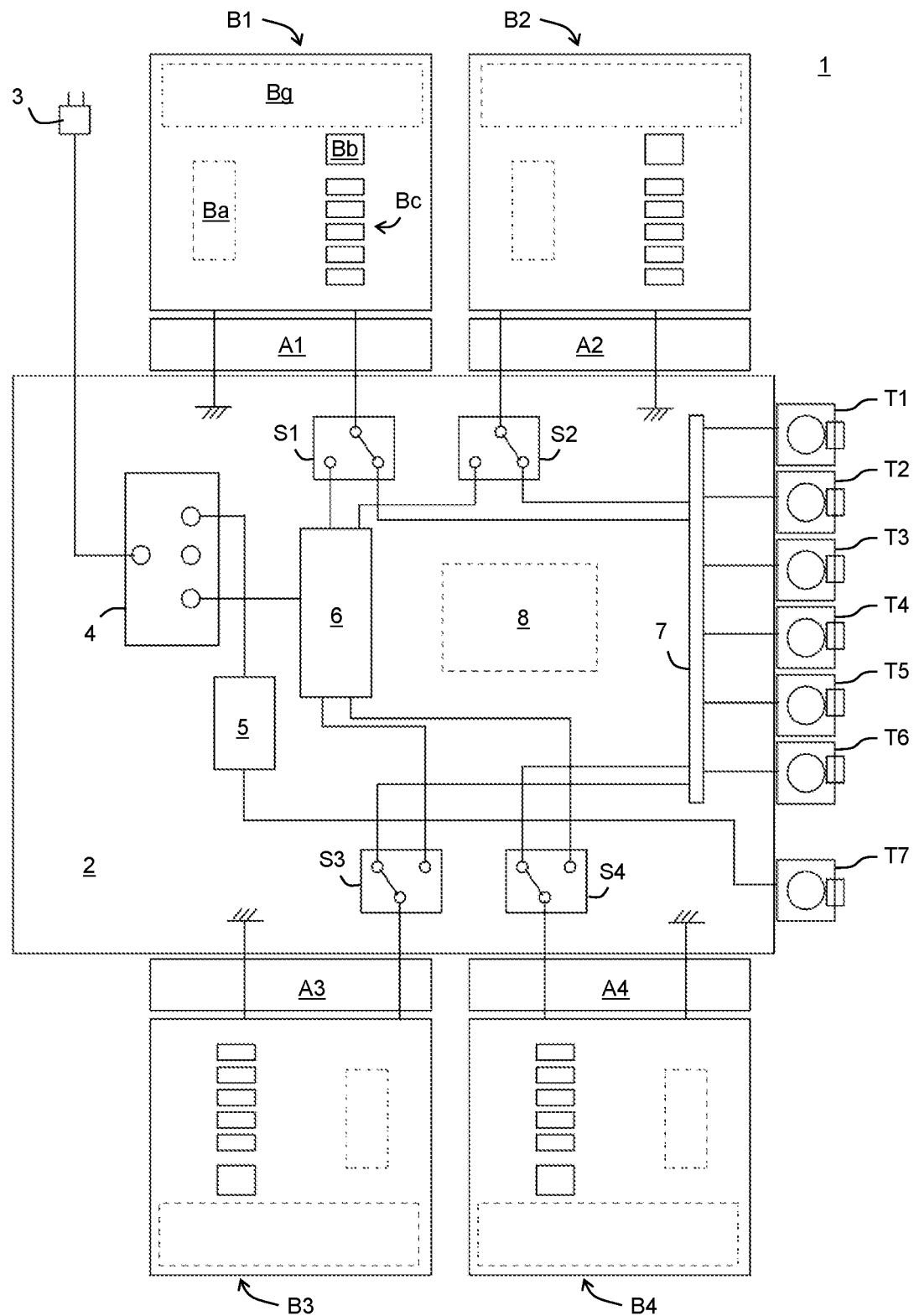
FIG. 1 shows a configuration of a battery system 1 according to a first embodiment of the present invention.
Figure 2:
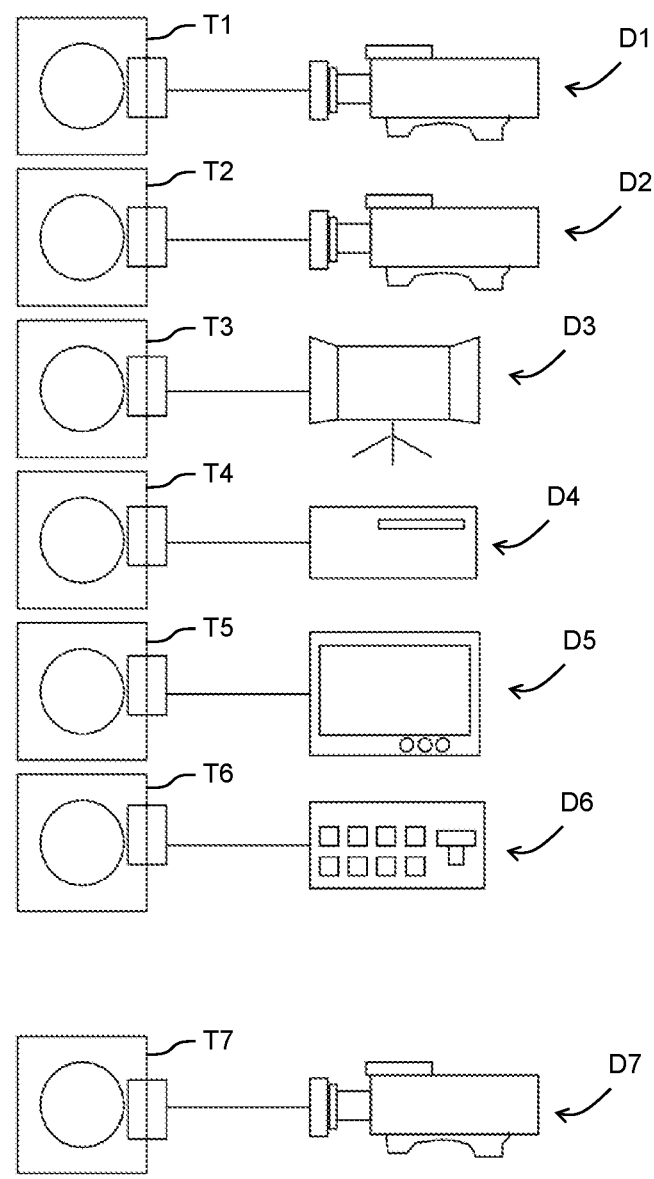
FIG. 2 shows a connection state of DC output terminals T1 to T7 and devices D1 to D7.
Figure 3:
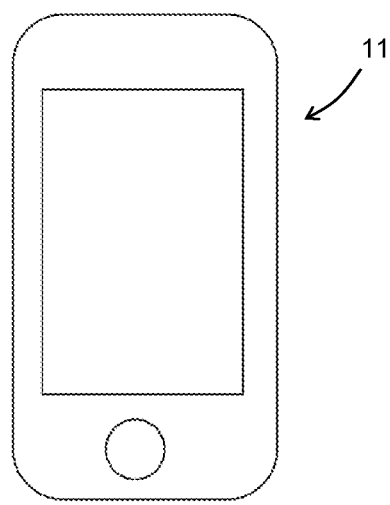
FIG. 3 shows a configuration of a mobile phone 11.

As shown in FIGS. 1 to 3, a battery system 1 according to a first embodiment of the present invention includes a battery charger 2 and multiple batteries B1 to B4 (referred to as battery B when distinction is not necessary), a mobile phone 11 and devices D1 to D7.

The battery charger 2 includes an AC input terminal 3, a changeover switch 4, an AC-DC converter 5, a charge control circuit 6, a distribution unit 7, a communication module 8, control switches S 1 to S 4, a DC output terminal. T1 to T7 and battery mounting adapters A1 to A4.

The AC input terminal 3 is connectable to an AC power source, and AC power can be input to the battery charger 2 through the AC input terminal 3.

The changeover switch 4 can switch between the battery charge mode, OFF, and the AC-DC output mode. In the battery charge mode, charging of the batteries B1 to B4 is possible. In the AC-DC output mode, AC power is converted to DC power by the AC-DC converter 5 and can be output from the DC output terminal T7.

The charge control circuit 6 controls charging of the batteries B1 to B4.

The control switches S1 to S4 corresponds to the batteries B1 to B4, respectively. The control switches S1 to S4 can individually switch between the charge mode and the output mode for the batteries B1 to B4. In the charge mode, charging to the batteries B1 to B4 is performed using the AC power supply as a power source, and in the output mode, DC power is output from the batteries B1 to B4. The power distribution unit 7 distributes DC power from the batteries B1 to B4 to DC output terminals T1 to T6. With such a configuration, DC voltages are output from the DC output terminals T1 to T6 using the batteries B1 to B4 as power sources.

Devices D1 to D7 are connected to at least one of the DC output terminals T1 to T7. The devices D1 to D7 are, for example, devices operating with DC power, such as a camera, a lighting apparatus, a recorder, a monitor, and a switcher.

The batteries B1 to B4 are, for example, lithium ion batteries, and are attached to the battery charger 2 via the battery attachment adapters A1 to A4 so that charging and discharging through the battery charger 2 are possible. The batteries B1 to B4 are provided with battery cells Bg, and are stored in the battery cells Bg. The batteries B1 to B4 have the same configuration, and each include the communication module Ba, the push button switch Bb, and the battery indicator Bc.

The mobile phone 11 is, for example, a smartphone, and can communicate with the battery charger 2 through the communication module (external LAN connection/wireless communication module) 8, and can communicate with the batteries B1 to B4 through the communication module Ba. The communication is preferably wireless communication.

1-2. Battery System 1 Operation

When Operating a Device with AC Power Source

The device D7 is connected to the DC output terminal T7, and the changeover switch 4 is set to the AC-DC output mode. As a result, a DC voltage is output from the DC output terminal T7 using the AC power source as a power source, and the device D7 can be operated.

When Charging Batteries B1 to B4

With the batteries B1 to B4 attached to the battery charger 2, the changeover switch 4 is set to the battery charge mode, and the control switches S1 to S4 are set to the charge mode. Thus, the batteries B1 to B4 are charged.

When Outputting DC Power from Batteries B1 to B4

With the batteries B1 to B4 attached to the battery charger 2, the changeover switch 4 is set to the battery charge mode, and the control switches S1 to S4 are set to the output mode. As a result, DC voltages are output from the DC output terminals T1 to T6 using the batteries B1 to B4 as power sources, and the devices D1 to D6 can be operated.

When charging some of the batteries B1 to B4 and outputting DC power from some of them The control switches S1 to S4 can be controlled independently. Therefore, it is possible to switch between the charge mode and the output mode for the batteries B1 to B4 individually. For example, the batteries B1 to B2 can be set to the charge mode, and the batteries B3 to B4 can be set to the output mode. In this case, it is possible to output DC power from the batteries B3 to B4 while charging the batteries B1 to B2. When charging of the batteries B1 to B2 is completed, the batteries B3 to B4 can be set to the charge mode, and the batteries B1 to B2 can be set to the output mode. As another operation mode, battery modes may be switched one by one in order. For example, after a predetermined time has elapsed since the modes of the batteries B1 to B4 are set to the charge mode, charge mode, output mode, and output mode, respectively, mode change is performed so that the battery B2 is in the output mode and the battery B4 is in the charging mode. When a predetermined time elapses from this mode change, another mode change is performed so that the battery B1 is set to the output mode and the battery B3 is set to the charge mode. According to such a way of mode changes, it is possible to switch between the charge mode and the output mode without interrupting the output of the DC voltage from the DC output terminals T1 to T6.

1-3. Condition Monitoring

The application program installed in the mobile phone 11 and the battery charger 2 can communicate wirelessly and interlock with each other, and the locations and states of the respective batteries B1 to B4 being charged can be checked with the mobile phone 11.

Alternatively, the application program installed in the mobile phone 11 and the batteries B1 to B4 being charged by the battery charger 2 can communicate directly and wirelessly and interlock with each other, and the states, the number of times of charging, and the internal temperatures of the respective batteries B1 to B4 can be checked by the mobile phone 11. For example, the above check can be performed by operating (for example, a long press) switches Bb provided to the respective batteries B1 to B4.

2. Second Embodiment

Figure 4:
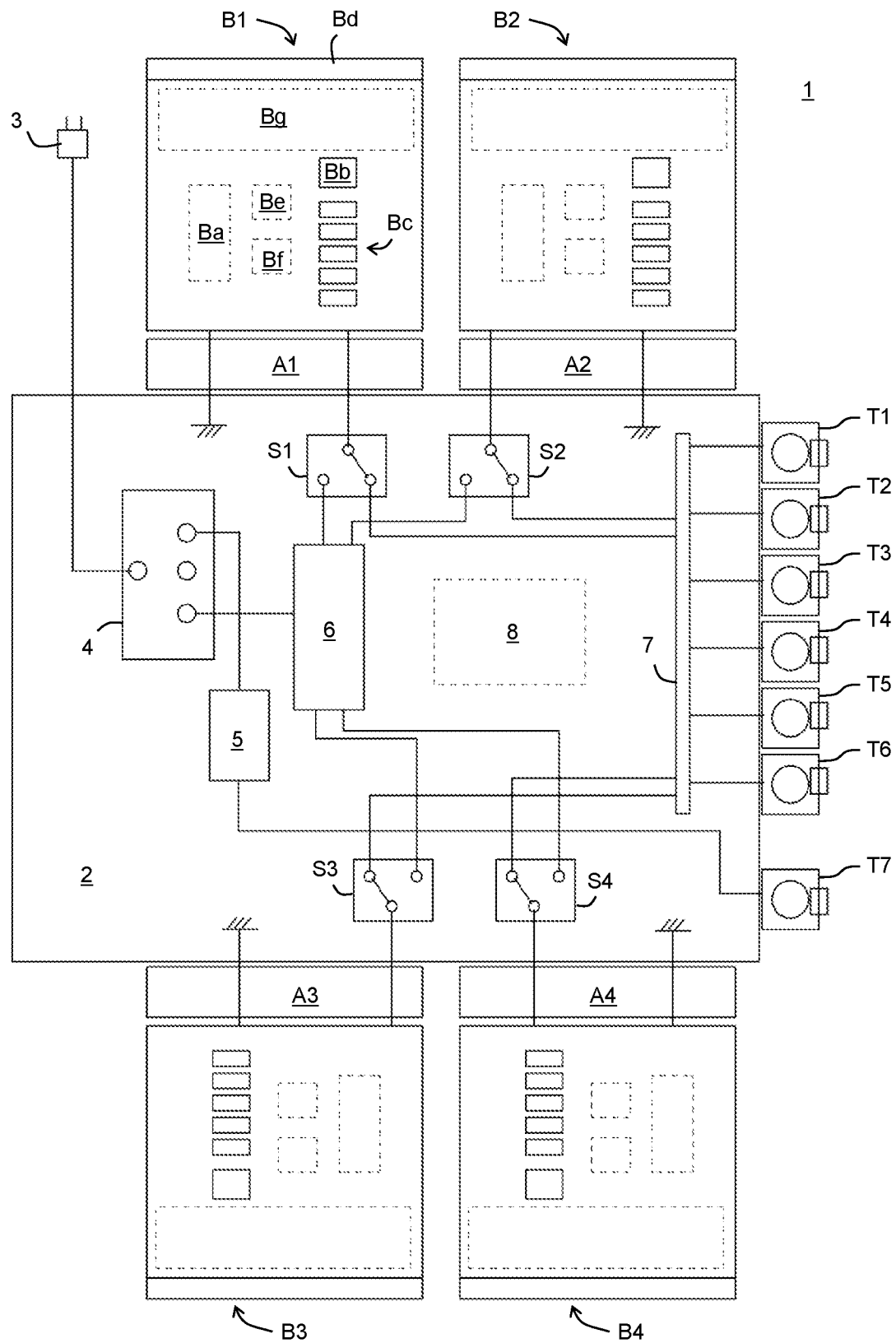
FIG. 4 shows a configuration of a battery system 1 according to a second embodiment of the present invention.

A battery system 1 according to a second embodiment of the present invention will be described with reference to FIG. 4. The present embodiment is similar to the first embodiment, and the main differences are the differences in the configurations of the batteries B1 to B4. The differences will be mainly described below.

In the present embodiment, the batteries B1 to B4 each have a heater Bd, a temperature sensor Be, and a heater control unit Bf in addition to the configuration of the first embodiment. The heater control unit Bf controls the operation of the heater Bd based on the temperature detected by the temperature sensor Be. More specifically, when the temperature detected by the temperature sensor Be is equal to or lower than the threshold, the heater control unit Bf operates the heater Bd to heat the battery cell Bg. In a low temperature environment, the capacity of the battery cell Bg decreases, so that the capacity of the battery cell Bg can be increased by heating.

The heater Bd preferably operates with the power stored in the battery cell Bg. In this case, the heater Bd can be operated even when there is no AC power source. On the other hand, in this case, the power stored in the battery cell Bg is consumed by the amount of operating the heater Bd. However, when the increase in capacity of the battery cell Bg due to heating exceeds the power consumption by the heater, the amount of power output from the batteries B1 to B4 can be increased by operating the heater Bd.

3. Third Embodiment

Figure 5:
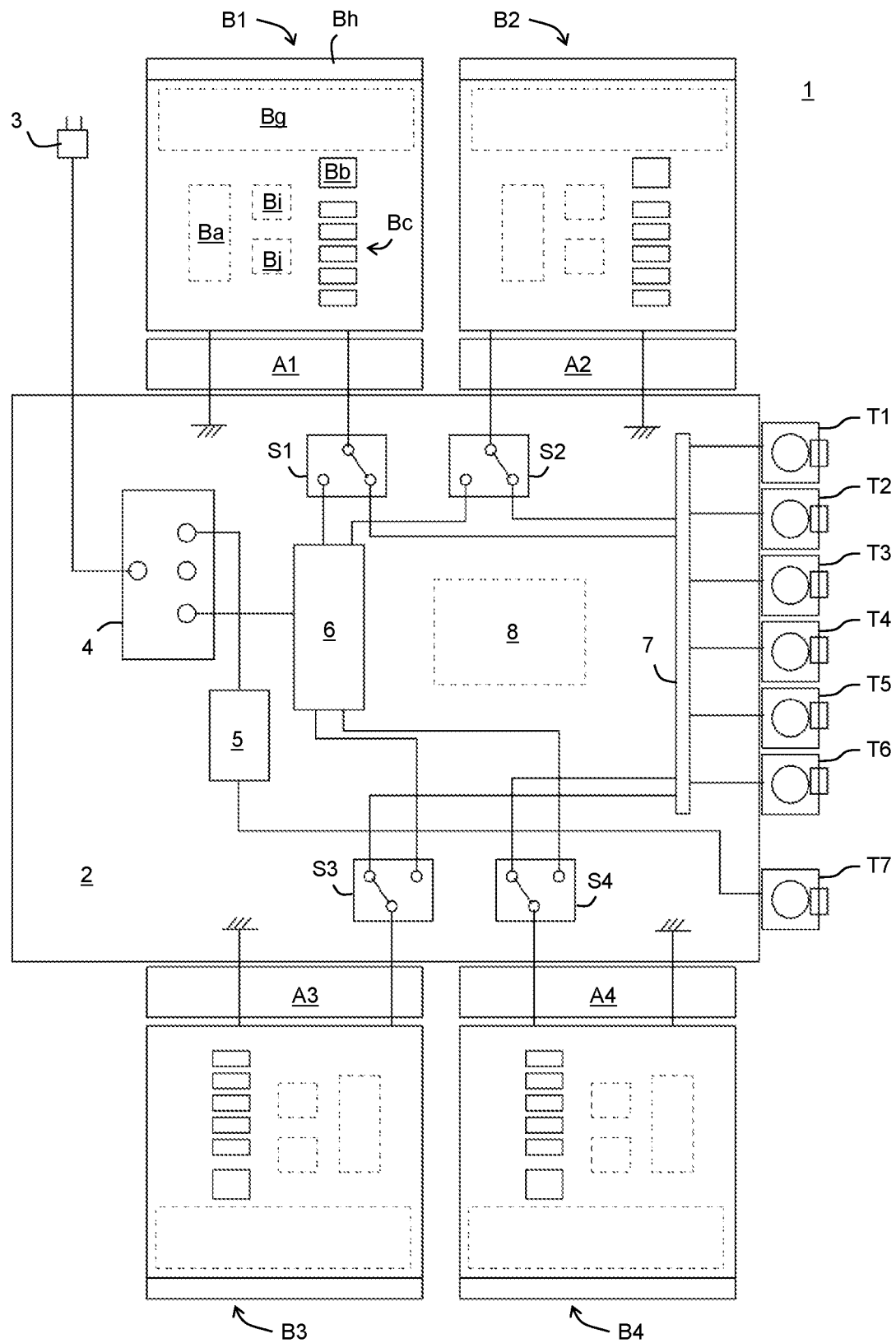
FIG. 5 shows a configuration of a battery system 1 according to a third embodiment of the present invention.

A battery system 1 according to a third embodiment of the present invention will be described with reference to FIG. 5. The present embodiment is similar to the first embodiment, and the main differences are the differences in the configurations of the batteries B1 to B4. The differences will be mainly described below.

In the present embodiment, in addition to the configuration in the first embodiment, the batteries B1 to B4 include a resistor Bh, a remaining amount detection unit Bi, and a discharge control unit Bj. The resistor Bh is, for example, a cement resistor. The heater Bd of the second embodiment may be used as the resistor Bh. The remaining amount detection unit Bi can detect the remaining amount of power of the battery cell Bg based on a voltage or the like. The discharge control unit Bj causes the power from the battery cell Bg to flow to the resistor Bh based on the predetermined condition to consume the power and reduce the remaining power of the battery cell Bg. The following conditions are exemplified as the predetermined condition.

(a) The discharge is continued when the remaining power of the battery cell Bg is equal to or greater than a predetermined threshold, and stopped when the remaining power of the battery cell Bg becomes below the threshold. Specifically, the threshold is, for example, 5, 10, 15, 20, 25, 30, 35, 40, 45, 50%, and may be in the range between any two of the numerical values exemplified here.

(b) Discharge continues until a predetermined time has elapsed from the start of discharge.

The discharge control unit Bj preferably does not completely discharge the battery cell Bg. It is because the time taken for the subsequent charging will be very long if the battery cell Bg. is completely discharged.

If the remaining power of the battery cell Bg is excessive, the battery is likely to be judged as dangerous upon air transportation. In this embodiment, for example, the battery is provided with a discharge mode, and in this mode, the remaining power of the battery cell Bg can be easily reduced by flowing the power from the battery cell Bg to the resistor Bh.

The resistor Bh, the remaining amount detection unit Bi, and the discharge control unit Bj may be provided in the battery charger 2. In this case, the remaining amount detection unit Bi can detect the remaining amount of power of the battery, and the discharge control unit Bj causes the power from the battery to flow to the resistor Bh based on a predetermined condition to cause power consumption and reduce the remaining power.

4. Other Embodiments

The present invention can also be embodied in the following modes.

The battery charger 2 may have a configuration other than that shown in FIG. 1

The batteries B1 to B4 may be batteries of types other than lithium ion batteries.

DESCRIPTION OF REFERENCE SIGNS

1: Battery system
2: Battery charger
3: AC input terminal
4: Changeover Switch
5: AC-DC converter
6: Charge control circuit
7: Distribution unit
8: Communication module
A1 to A4: Battery attachment adapter
B1 to B4: Battery
Ba: Communication module
Bb: Push button switch
Bc: Battery indicator
Bd: Heater
Be: Temperature sensor
Bf: Heater control unit
Bg: Battery cell
Bh: Resistor
Bi: Remaining amount detection unit
Bj: Discharge control unit
D1 to D7: Devices
11: Mobile phone
S1 to S4: Control switch
T1 to T7: DC output terminal While illustrative embodiments have been illustrated and described, it will be appreciated that various changes can be made therein without departing from the spirit and scope of the invention.

The invention claimed is:

1. A battery charger, wherein
the battery charger is configured to be connectable to an AC power source and multiple batteries, and comprises a changeover switch, control switches, and a terminal for outputting a DC voltage, wherein the control switches are configured for, independently from each other, switching between a charge mode and an output mode for the multiple batteries, respectively, such that at least one battery of the multiple batteries is in the charge mode while at least one of the multiple batteries is in the output mode, the charge mode being a mode for charging the batteries using the AC power source as a power source and the output mode being a mode for outputting the DC voltage from the terminal using the batteries as a power source, the changeover switch is configured to be capable of switching between outputting the DC voltage from the terminal using the AC power source as a power source and outputting the DC voltage from the terminal using the batteries as a power source.

2. The battery charger of claim 1, further comprising a resistor and a discharge control unit, wherein the discharge control unit is configured to cause power from the batteries to flow to the resistor to consume the power based on a predetermined condition, thereby reducing the remaining power of the batteries.

3. A battery system comprising the battery charger of claim 1 and batteries attached thereto.

4. The battery system of claim 3, further comprising a mobile phone, wherein the battery system is configured so that an application program installed in the mobile phone and the battery charger communicate wirelessly and interlock with each other so that locations and states of the respective batteries being charged can be checked with the mobile phone.

5. The battery system of claim 3, further comprising a mobile phone, wherein the battery system is configured so that an application program installed in the mobile phone and the batteries being charged by the battery charger communicate directly and wirelessly and interlock with each other so that states, the number of times of charging, and the internal temperatures of the respective batteries can be checked by the mobile phone.

6. The battery system of claim 5, wherein the check is performed by operating switches provided to the respective batteries.

7. The battery system of claim 3, wherein the batteries each comprises a battery cell and a heater to heat the battery cell.

8. The battery system of claim 7, wherein the heater is configured to operate with power stored in the battery cell.

9. The battery system of claim 7, wherein the batteries each comprises a temperature sensor which is capable of detecting a temperature, and the heater is configured to operate when the temperature detected by the temperature sensor is equal to or lower than a threshold.

10. A battery system comprising:

a battery cell and a heater to heat the battery cell, wherein the heater is configured to operate with power stored in the battery cell; and the battery charger of claim 1.

11. The battery system of claim 10, further comprising a temperature sensor which is capable of detecting a temperature, wherein the heater is configured to operate when the temperature detected by the temperature sensor is equal to or lower than a threshold.

12. A battery system comprising:

a battery cell;

a resistor;

a discharge control unit, wherein the discharge control unit is configured to cause power from the battery cell to flow to the resistor based on a predetermined condition to consume the power and reduce a remaining power of the battery cell; and the battery charger of claim 1.

* * * * *

UNITED STATES PATENT AND TRADEMARK OFFICE
CERTIFICATE OF CORRECTION

PATENT NO. : 11,152,798 B2
APPLICATION NO. : 16/430174
DATED : October 19, 2021
INVENTOR(S) : Hashiguchi Page 1 of 1

It is certified that error appears in the above-identified patent and that said Letters Patent is hereby corrected as shown below:

On the Title Page

| Column | Line | |
| --- | --- | --- |
| item (57), | 5 | change "charge is" to -- charger is -- |

In the Claims

| Column | Line | |
| --- | --- | --- |
| 8 | 8 | change "comprises a" to -- comprise a -- |
| 8 | 14 | change "comprises a" to -- comprise a -- |

Signed and Sealed this
Sixth Day of September, 2022

Katherine Kelly Vidal
*Director of the United States Patent and Trademark Office*